United States Patent [19]

Erasmus

[11] 3,720,610

[45] March 13, 1973

[54] THINNER FOR DRILLING FLUIDS
[75] Inventor: Albert Erasmus, Ladenburg, Germany
[73] Assignee: Benckiser-Knapsack GmbH, Ludwigshafen/Rhine, Germany
[22] Filed: June 9, 1970
[21] Appl. No.: 44,888

[30] Foreign Application Priority Data

June 12, 1969 Germany..................P 19 29 968.4

[52] U.S. Cl...........................252/8.5 C, 252/8.5 A
[51] Int. Cl................................C10m 3/48
[58] Field of Search........252/8.5 A, 8.5 C, 356, 354; 260/438.5 R, 535 R

[56] References Cited

UNITED STATES PATENTS

| | | | |
|---|---|---|---|
| 2,150,954 | 8/1937 | White | 8/52 |
| 2,395,307 | 2/1946 | Weber et al. | 260/439 R |
| 2,615,846 | 10/1952 | Dvorkovitz et al. | 252/156 |
| 2,295,067 | 9/1942 | Williams | 252/8.5 |
| 1,999,766 | 4/1935 | Lawton et al. | 252/8.5 |
| 3,027,323 | 3/1962 | Stuchell et al. | 252/8.5 |
| 2,935,504 | 5/1960 | King et al. | 252/8.5 |
| 2,605,221 | 7/1952 | Hoeppel | 252/8.5 |
| 3,505,243 | 4/1970 | Steinberg et al. | 252/8.5 |

OTHER PUBLICATIONS

Sawyer et al., Metal Gluconate Complexes, Article in Chemical Reviews, Vol. 64, 1964, pages 633 to 643.
Traube et al., Chemische Berichte, Vol. 69, 1936, Pages 2655 to 2666.

Primary Examiner—Herbert B. Guynn
Attorney—Erich M. H. Radde and Gerard J. Weiser

[57] ABSTRACT

The thinner according to this invention added to drilling fluids used for drilling for petroleum or natural gas is gluconic acid and/or its heavy metal salts and/or its alkali metal-heavy metal salts, especially chromic gluconate and/or an alkali metal chromic gluconate.

10 Claims, No Drawings

THINNER FOR DRILLING FLUIDS

BACKGROUND OF THE INVENTION

1. Field of the Invention

The present invention relates to a valuable and highly effective additive to drilling fluids used in drilling for petroleum and natural gas and to a method of using same.

2. Description of the Prior Art

Drilling fluids based on aqueous media are usually composed of a suspension of swellable, hydratable clays, for instance, montmorillonite. Such suspensions have frequently added thereto barite (barium sulfate) and others to increase their density. The filtration properties of drilling muds, measured as filtrate loss are controlled by the addition of organic protective colloids, such as carboxymethyl cellulose. The drilling fluid must meet a number of requirements. It is pumped through the drill pipe during drilling, picks up cuttings, and then returns to the surface between the wall of the drilled hole and the drill pipe. Thereby it removes the rock chips from the cutting face of the bit and transports these cuttings to the surface. Thereafter the cuttings are separated from the drilling mud by means of screening devices and settling and the screened and settled drilling mud is recirculated. The drilling fluid, furthermore, provides lubrication of the drill string, bit teeth, and the bit bearings and cools the drill bit during drilling. In addition thereto the drilling fluid prevents, due to its specific properties that the drilled hole collapses. Drilling fluids are thixotropic and thus prevent the cuttings to drop upon the drilling bit if drilling is temporarily interrupted. Certain conditioning agents are added to the drilling fluid for controlling its properties as desired. Such conditioning agents act primarily as thinners whereby a certain degree of thixotropy is maintained, i.e., the fluid must still be relatively thin and must be capable of being pumped even if its solids content is increased. The drilling fluid must also be relatively resistant to the action of electrolytes because, on drilling, the salt content of the drilling mud varies very considerably due to the different rock layers through which the drill bit passes.

It is known to use, as mud thinners, plant tannins such as quebracho, lignosulfonic acid and its salts, especially the chromium, iron, cobalt, sodium, and aluminum salts and mixtures of said salts, furthermore lignitic materials and polyphosphates. However, these mud thinners cannot be added to all type of drilling fluids or under all kind of drilling conditions. For instance, polyphosphates hydrolyze at elevated temperature and other thinners can only be used under certain conditions or not at all in drilling fluids which have become deteriorated by the action of electrolytes.

SUMMARY OF THE INVENTION

It is one object of the present invention to provide a drilling mud thinner having a wide range of application, being free of the disadvantages of the known thinners and meeting all the requirements of a satisfactory all-around drilling fluid.

Another object of the present invention is to provide a drilling fluid containing such a mud thinner.

A further object of the present invention is to provide a highly effective method of drilling with drilling fluids containing such a mud thinner.

Other objects of the present invention and advantageous features thereof will become apparent as the description proceeds.

In principle the mud thinner according to the present invention to be added to drilling fluids consists of gluconic acid or its salts. The preferred thinners for drilling fluids are the heavy metal compounds of gluconic acid and most advantageously the salts or, respectively, the complex compounds with trivalent chromium. In place of, or in addition to, the chromium compounds of said acid, compounds thereof can be used which contain other cations such as the ions of the alkali metals, the alkaline earth metals, nickel, copper, cobalt, iron, manganese, thallium, and others.

The gluconic acid compounds can be added to the drilling fluids as such or in mixture with each other. Especially advantageous thinners are the alkali metal-chromium gluconates or, respectively, the iron-chromium gluconates.

Furthermore, gluconic acid and/or the gluconates can be used for thinning drilling fluid, together with other known thinners such as tanning agents, lignosulfonates, lignitic materials, or the like.

The amounts of gluconic acid and/or gluconic acid compounds to be added are between about 0.1 and about 5 percent and are preferably between about 0.2 and about 1.5 percent calculated for the drilling fluid.

The use of gluconic acid and/or its compounds has the advantage that they can be added even at higher temperatures without any loss in effectiveness. In contrast to the conventional thinners for drilling fluids which usually require amounts far exceeding 0.5 percent, amounts of about 0.5 percent and even less of gluconic acid and/or its compounds are usually sufficient to achieve the same effect. Furthermore, the chromium containing gluconic acid compounds additionally exhibit a corrosion inhibiting effect. This property is of special importance since it obviates the addition of corrosion inhibitors.

DESCRIPTION OF THE PREFERRED EMBODIMENTS

The following examples serve to illustrate the present invention without, however, limiting the same thereto.

EXAMPLE 1

To a neutral Altwarmbuechener clay drilling fluid of a density of 1.2, a pH-value of 8.3, and a gypsum content of 0.5 percent, there are added various amounts of chromic gluconate, namely amounts, of 0.2 0.5, and 0.8 percent. The thinning, i.e., viscosity reducing effect and the fluid loss values of said drilling fluids were determined. The fluid loss measurements were carried out with the Fann-filter press. The viscosity was determined with the Fann-V-G-meter. Measuring methods and measuring apparatus are those described in the specifications of API-Code RP 29. (Recommended Practice Standard Field Testing of Drilling Fluids).

The following values were found:

Table I

|  | Without addition | Chromic gluconate added | | |
|---|---|---|---|---|
|  |  | 0.2% | 0.5% | 0.8% |
| Filter cake thickness in mm. | 3.1 | 1.3 | 0.8 | 0.8 |

| | | | | |
|---|---|---|---|---|
| Fluid loss in ml. | 35.3 | 14.2 | 12.3 | 8.9 |
| Gel strength in dyn/sq.cm. | 462 | 68 | 31 | 44 |
| Yield point in dyn/sq.cm. | 438 | 92 | 23 | 22 |

As is evident from these tests, a very considerable improvement in the fluid loss values is observed with an addition of such a small amount as 0.2 percent of chromic gluconate. A noteworthy decrease in viscosity takes place as is evident from these thinning values. Optimum thinning with this composition is achieved with an addition of 0.5 percent of chromic gluconate.

EXAMPLE 2

Increasing amounts of Altwarmbuechener clay designated in the following Table II as "AWT" are added to a drilling fluid consisting of 4.0 percent of bentonite sold under the trademark TIXOTON, i.e., an activated bentonite sold by the firm Schoenebecker Brunnenfilter of Schoenebeck near Brunswig, West-Germany,
0.4 percent of sodium hydroxide, and
1.0 percent of thinner.

The tests were carried out with the following thinners:

I: Conventional thinner on the basis of iron-chromium lignosulfonate sold under the trademark SPERSENE ("Maycobar" Magnesium-and Cove-Barium Corp. of Houston, Texas).

II: Conventional thinner on the basis of iron-chromium lignosulfonate sold under the trademark LS 33 (Farbwerke Hoechst of Frankfurt-Hoechst, West-Germany).

III: Thinner according to the present invention composed of 50 percent of lignosulfonate and 50 percent of chromic gluconate.

Table II

| AWT % | | 0 | 10 | 20 | 30 | 40 | 50 |
|---|---|---|---|---|---|---|---|
| Viscosity/ outflow in seconds | I | 33 | 35 | 37 | 39 | 43 | 52 |
| | II | 37 | 40 | 40 | 41 | 46 | 52 |
| | III | 35 | 37 | 39 | 43 | 45 | 51 |
| Fluid loss values in ml. | I | 22 | 12.8 | 9.5 | 7.8 | 6.4 | 5.8 |
| | II | 26 | 16 | 12.5 | 10.0 | 7.6 | 6.4 |
| | III | 23.8 | 13.8 | 10.9 | 9.3 | 7.6 | 6.1 |
| Yield point in dyn/sq.cm. | I | 14 | 9 | 14 | 19 | 24 | 48 |
| | II | 9 | 14 | 9 | 19 | 28 | 52 |
| | III | 9 | 9 | 14 | 14 | 19 | 24 |

The solids content of a drilling fluid is usually increased during drilling due to the uptake of drilled rock. This increase in solids content causes, of course, an increase in the viscosity of the drilling fluid and of the yield point. As is evident from the test results of Table II, a combination of chromic gluconate and lignosulfonate is especially useful to keep drilling fluids well flowable even if their solids content amounts to 50 percent.

The "Altwarmbuechener clay drilling fluid" used in the examples is a drilling fluid containing clay as it is recovered near Altwarmbuechen near Hannover, West-Germany. It contains about 20 percent of swellable clay. In place of drilling fluids containing such a hydratizable, swellable clay, there can be used drilling fluids containing other hydratizable, swellable clays, such as bentonites, for instance, bentonite from Geisenheim, Wyoming bentonite, the bentonites sold under the trademark CLARSOL by the Bentonite-Gesellschaft of Oran, Algeria.

Similar advantageous results as those given in the preceding examples, are obtained when replacing chromic gluconate and the mixture of chromic gluconate and lignosulfonate by the same amounts of gluconic acid itself or of other metal salts of gluconic acid, such as nickel gluconate, copper gluconate, cobalt gluconate, iron gluconate. Complex compounds of chromic gluconate such as sodium chromic gluconate, ferric chromic gluconate have a similar thinner effect as the chromic gluconate of the examples.

I claim:

1. Thinner for a drilling fluid composed of an aqueous suspension of a swellable, hydratable clay used in drilling for petroleum and natural gas, said thinner being a mixture of a gluconic acid compound selected from the group consisting of simple heavy metal salts of gluconic acid said heavy metal selected from the group consisting of nickel, cobalt, iron, copper, chromium, manganese, and thallium and the complex salts of said heavy metal gluconates with alkali metals and of at least one other thinner selected from the group consisting of natural tannins, lignosulfonates, and mined lignin.

2. Thinner according to claim 1, wherein the thinner is a mixture of said simple heavy metal salt of gluconic acid and at least one other thinner selected from the group consisting of natural tannins, lignosulfonates, and mined lignin.

3. A drilling fluid for drilling for petroleum and natural gas consisting of an aqueous suspension of a hydratable, swellable clay having added thereto between about 0.1 and about 5 percent of a gluconic acid compound selected from the group consisting of simple heavy metal salts of gluconic acid said heavy metal selected from the group consisting of nickel, cobalt, iron, chromium, manganese, and thallium and the complex salts of said heavy metal gluconates with alkali metals.

4. The drilling fluid according to claim 3, wherein the gluconic acid compound is added to the drilling fluid in an amount between about 0.2 and about 1.5 percent.

5. The drilling fluid according to claim 3, wherein a chromium salt of gluconic acid is added to the drilling fluid, said chromium salt being selected from the group consisting of chromic gluconate and a complex alkali metal-chromic gluconate.

6. The drilling fluid according to claim 3, wherein a complex chromium salt of gluconic acid is added to the drilling fluid, said complex chromium salt being selected from the group consisting of an alkali metal-chromium gluconate, an alkaline earth metal-chromium gluconate, and a heavy metal-chromium gluconate selected from the group consisting of nickel-chromium gluconate, cobalt-chromium gluconate, iron-chromium gluconate, and copper-chromium gluconate.

7. The drilling fluid according to claim 3, wherein the drilling fluid additionally contains at least one other thinner selected from the group consisting of natural tannins, lignosulfonates, and mined lignin.

8. The drilling fluid according to claim 5, wherein the drilling fluid additionally contains at least one other thinner selected from the group consisting of natural tannins, lignosulfonates, and mined lignin.

9. In a method of drilling for petroleum and natural gas, the step which consists in circulating in said well while drilling a drilling fluid composed of an aqueous suspension of a hydratable, swellable clay having added thereto between about 0.1 and about 5 percent of a gluconic acid compound selected from the group consisting of simple heavy metal salts of gluconic acid said heavy metal selected from the group consisting of nickel, cobalt, iron, chromium, manganese, and thallium and the complex salts of said heavy metal gluconates with alkali metals.

10. The method according to claim 9, wherein the gluconic acid salt is a chromium salt of gluconic acid being selected from the group consisting of chromic gluconate and a complex alkali metal-chromic gluconate.

* * * * *